(12) United States Patent
Jang et al.

(10) Patent No.: US 11,809,519 B2
(45) Date of Patent: Nov. 7, 2023

(54) SEMANTIC INPUT SAMPLING FOR EXPLANATION (SISE) OF CONVOLUTIONAL NEURAL NETWORKS

(71) Applicants: LG ELECTRONICS INC., Seoul (KR); The Governing Council of the University of Toronto, Toronto (CA)

(72) Inventors: Jongseong Jang, Toronto (CA); Hyunwoo Kim, Seoul (KR); YeonJeong Jeong, Toronto (CA); SangMin Lee, Seoul (KR); Sam Sattarzadeh, Richmond Hill (CA); Mahesh Sudhakar, Toronto (CA); Shervin Mehryar, Toronto (CA); Anthony Lem, Calgary (CA); Konstantinos Plataniotis, Toronto (CA)

(73) Assignees: LG ELECTRONICS INC., Seoul (KR); The Governing Council of the University of Toronto, Toronto (CA)

( * ) Notice: Subject to any disclaimer, the term of this patent is extended or adjusted under 35 U.S.C. 154(b) by 177 days.

(21) Appl. No.: 17/405,935

(22) Filed: Aug. 18, 2021

(65) Prior Publication Data
US 2022/0058431 A1 Feb. 24, 2022

(30) Foreign Application Priority Data
Aug. 19, 2020 (KR) .......................... 10-2020-0103902

(51) Int. Cl.
*G06F 18/213* (2023.01)
*G06N 3/04* (2023.01)
(Continued)

(52) U.S. Cl.
CPC ........ *G06F 18/213* (2023.01); *G06F 18/2113* (2023.01); *G06F 18/253* (2023.01);
(Continued)

(58) Field of Classification Search
CPC .. G06F 18/213; G06F 18/2113; G06F 18/253; G06N 3/04; G06N 3/045;
(Continued)

(56) References Cited

U.S. PATENT DOCUMENTS

2020/0175338 A1* 6/2020 Croxford ............. G06V 10/764
2021/0174497 A1* 6/2021 Yoo ....................... G06F 18/213

OTHER PUBLICATIONS

Rise, Petsiuk et al, 2018; https://arxiv.org/pdf/1806.07421.pdf (Year: 2018).*

(Continued)

*Primary Examiner* — Jianxun Yang
(74) *Attorney, Agent, or Firm* — LEE, HONG, DEGERMAN, KANG & WAIMEY PC

(57) ABSTRACT

Embodiments of the present disclosure relate to generating explanation maps for explaining convolutional neural networks through attribution-based input sampling and block-wise feature aggregation. An example of a disclosed method for generating an explanation map for a convolutional neural network (CNN) includes obtaining an input image resulting in an output determination of the CNN, selecting a plurality of feature maps extracted from a plurality of pooling layers of the CNN, generating a plurality of attribution masks based on the plurality of feature maps, applying the generated attribution masks to the input image to obtain a plurality of visualization maps, and generating an explanation map of the output determination of the CNN based on the plurality of visualization maps.

15 Claims, 13 Drawing Sheets
(8 of 13 Drawing Sheet(s) Filed in Color)

(51) Int. Cl.
  G06V 10/28    (2022.01)
  G06V 10/32    (2022.01)
  G06F 18/25    (2023.01)
  G06F 18/2113  (2023.01)
(52) U.S. Cl.
  CPC .............. *G06N 3/04* (2013.01); *G06V 10/28* (2022.01); *G06V 10/32* (2022.01)
(58) Field of Classification Search
  CPC ........ G06N 3/084; G06V 10/28; G06V 10/32; G06V 10/82; G06V 10/945
  See application file for complete search history.

(56) References Cited

OTHER PUBLICATIONS

Fong et al., "Understanding Deep Networks via Extermal Perturbations and Smooth Masks" In proceedings of the IEEE International Conference on Computer Vision, 9 pages, 2019.

Petsiuk et al., "RISE: Randomized Input Sampling for Explanation of Black-box Models", In Proceedings of the British Machine Vision Conference (BMVC), 17 pages, 2018.

Selvaraju et al., "Grad-CAM: Visual Explanations from Deep Networks via Gradient-based Localization", In Proceedings of the IEEE international conference on computer vision, 23 pages, 2017.

Chattopadhyay et al., "Grad-CAM++: Improved Visual Explanations for Deep Convolutional Networks", arXiv preprint arXiv:1710.11063, 17 pages, 2017.

Wang et al., "Score-CAM: Score-Weighted Visual Explanation for Convolutional Neural Networks", arXiv preprint arXiv:1910.01279, 11 pages, 2019.

Sundararajan et al., "Axiomatic Attribution for Deep Networks", In Proceedings of the 34th International Conference on Machine Learning =—vol. 70, 18 pages, 2017.

Srinivas et al., "Full-Gradient Representation for Neural Networks Visualization", In Advances in Neural Information Processing Systems, 10 pages, 2019.

* cited by examiner

| Model | Metric | Grad-CAM | Grad-CAM++ | Extremal Perturbation | RISE | Score-CAM | Integrated Gradient | FullGrad | SISE |
|---|---|---|---|---|---|---|---|---|---|
| VGG16 | EBPG | 55.44 | 46.29 | 61.19 | 33.44 | 46.42 | 36.87 | 38.72 | 60.54 |
| | mIoU | 26.52 | 28.1 | 25.44 | 27.11 | 27.71 | 14.11 | 26.61 | 27.72 |
| | Bbox | 51.7 | 55.59 | 51.2 | 54.59 | 54.98 | 33.97 | 54.17 | 55.68 |
| | Drop | 49.47 | 60.63 | 43.90 | 39.62 | 39.79 | 64.74 | 60.78 | 38.40 |
| | Increase | 31.08 | 23.89 | 32.65 | 37.76 | 36.42 | 26.17 | 22.73 | 37.96 |
| ResNet-50 | EBPG | 60.08 | 47.78 | 63.24 | 32.86 | 35.56 | 40.62 | 39.55 | 66.08 |
| | mIoU | 32.16 | 30.16 | 26.29 | 27.4 | 31.0 | 15.41 | 20.2 | 31.37 |
| | Bbox | 60.25 | 58.66 | 52.34 | 55.55 | 60.02 | 34.79 | 44.94 | 61.59 |
| | Drop | 35.80 | 41.77 | 39.38 | 39.77 | 35.36 | 66.12 | 65.99 | 30.92 |
| | Increase | 36.58 | 32.15 | 34.27 | 37.08 | 37.08 | 24.24 | 25.36 | 40.22 |

FIG 11

| XAI method | Drop% | Increase% |
|---|---|---|
| Grad-CAM | 67.44 | 12.46 |
| Grad-CAM++ | 64.1 | 12.96 |
| RISE | 63.25 | 15.63 |
| Score-CAM | 64.29 | 10.35 |
| FullGrad | 77.23 | 10.26 |
| SISE | 61.06 | 15.64 |

FIG 12

SEMANTIC INPUT SAMPLING FOR EXPLANATION (SISE) OF CONVOLUTIONAL NEURAL NETWORKS

CROSS-REFERENCE TO RELATED APPLICATIONS

Pursuant to 35 U.S.C. § 119(a), this application claims the benefit of earlier filing date and right of priority to Korean Patent Application No. 10-2020-0103902, filed on Aug. 19, 2020, the contents of which are all hereby incorporated by reference herein in its entirety.

FIELD

The present disclosure relates to generating explanation maps for explaining convolutional neural networks through attribution-based input sampling and block-wise feature aggregation, also referred to herein as Semantic Input Sampling for Explanation (SISE).

BACKGROUND

Convolutional Neural Networks (CNN) have become a highly useful tool for artificial intelligence tasks such as image classification and processing. Deep Neural models based on CNNs have rendered inspiring breakthroughs in a wide variety of computer vision tasks. However, these models are often limited to outputting a classification or processing result with little to no explanation as to how the result was obtained. Thus, the lack of interpretability presents a great obstacle in the understanding of the decisions made by these models. This further diminishes the trust consumers have for CNNs and Artificial Intelligence in general, and may hinder the interactions between users and systems established based on such models.

As an emerging field in Machine Learning, Explainable AI (XAI) attempts to interpret these cumbersome models. The offered interpretation ability has put XAI in the center of attention in various fields, especially where any single false prediction can cause severe consequences (e.g., healthcare) or where regulations force decision-making systems to provide users or systems relying on such models with understandable explanations (e.g., criminal justice). This field aims to visualize the behavior of models trained for image recognition tasks.

To achieve visual explanations for CNNs, methods based on class activation mapping and randomized input sampling have gained great popularity. The outcome of these methods is an "explanation map", which is an image of a heatmap having the same size as the input image. FIG. 1 depicts examples of explanation maps 101, 102 generated based on an input image 100 that is input to a classification CNN. Based on a determination by the CNN that the input image includes an image of a "Horse" 103, with a confidence level of 0.9956, the existing methods generate explanation maps 101 indicating the levels of contribution of various portions of the input image to the final determination of "Horse." Based on a determination by the CNN that the input image includes an image of a "Person" 104, with a confidence level of 0.0021, the existing methods generate explanation maps 102 indicating the levels of contribution of various portions of the input image to the final determination of "Person." The "hot" regions of the heatmap, denoted by the red/yellow colored regions represent the portions of the input image which have the greatest impact on the model's decision, while the "cold" regions of the heatmap, denoted by blue/green colors represent the portions of the input image which have little to no impact on the model's decision making.

Prior works on visual explainable AI, such as those shown in FIG. 1, can be broadly categorized into 'approximation-based', 'backpropagation-based', 'perturbation-based', and 'CAM-based' methodologies. In backpropagation-based methods, only the local attributions are represented, making them unable to measure global sensitivity. CAM-based methods operate in three steps: 1) feeding the model with the input image, 2) scoring the feature maps in the last convolutional layer, and 3) combining the feature maps using the computed scores as weights. Despite the strength of CAM-based methods in capturing the features extracted in CNNs, the lack of localization information in the coarse high-level feature maps limits such methods' performance by producing blurry explanations. Also, upsampling low-dimension feature maps to the size of input images distorts the location of captured features in some cases.

These drawbacks are addressed by image perturbation techniques used in recent works such as RISE (Petsiuk, V.; Das, A.; and Saenko, K. 2018. *RISE: Randomized Input Sampling for Explanation of Black-box Models*), and Score-CAM (Wang, H.; Wang, Z.; Du, M.; Yang, F.; Zhang, Z.; Ding, S.; Mardziel, P.; and Hu, X. 2020. *Score-CAM: Score-Weighted Visual Explanations for Convolutional Neural Networks*). These visual explanation methods probe the model's behavior using perturbed copies of the input. Most of the perturbation-based methods' noticeable property is that they treat the model like a "black-box" instead of a "white-box."

As an example of a random sampling method, FIG. 2 shows an input image 201 to be input to a CNN model 204 for classification. FIG. 2 shows examples of random perturbation masks 202 which are implemented in the RISE method existing in the prior art. The black mask portions of the perturbation masks are randomly generated, and the input image is perturbed, or masked, with the various perturbation masks such that only the regions of the input image corresponding to the white areas are remaining in the perturbed images 203. The perturbed images 203 are then input to the CNN 204, and the resulting classification and confidence score is used to determine which regions of the input image contribute the most to the CNNs decision based on the corresponding perturbation mask—resulting in an explanation heatmap 205 as discussed with respect to FIG. 1.

However, these existing procedures involve feedforwarding several perturbed images, which makes them very inefficient and slow. They also suffer from instability as their output depends on random sampling or random initialization for optimizing a perturbation mask. Also, such algorithms require an excessive runtime to provide their users with generalized results. Further, explanation maps produced by CAM-based methods suffer from a lack of spatial resolution as they are formed by combining the feature maps in the last convolutional layer of CNNs, which lack spatial information regarding the captured attributions. Thus, the attribution methods based on the existing methods provide inefficient, low-resolution, and blurry explanation maps that limit their explanation ability.

SUMMARY

To address the above issues, visualization and explanation of CNN decision making based on various layers of the CNN is provided. Visualization maps from multiple layers of the model are collected based on an attribution based input sampling techniques and the visualization maps are then aggregated to reach a fine-grain and complete explanation map. A layer selection strategy of the CNN is provided that applies to the whole family of CNN-based models to visualize the last layers of each convolutional block of the model.

Embodiments of the present disclosure provide visual explanation algorithm specialized to the family of CNN-based models. The present disclosure includes a discussion of attribution-based input sampling and block-wise feature aggregation, also referred to herein as Semantic Input Sampling for Explanation (SISE), which generates explanations by aggregating visualization maps obtained from the output of convolutional blocks through attribution-based input sampling. Embodiments of the present disclosure output high-resolution explanation maps which far outperform those of the existing art, resulting in a greater level of insight into the decision making of a CNN provided to users.

Embodiments of the present disclosure include systems, methods, and computer-readable media for generating an explanation map for a convolutional neural network (CNN) through attribution-based input sampling and block-wise feature aggregation. An embodiment of a method of the present disclosure for outputting an explanation map for an output determination of a convolutional neural network (CNN) based on an input image includes extracting a plurality of sets feature maps from a corresponding plurality of pooling layers of the CNN, obtaining a plurality of attribution masks based on subsets of the plurality of sets of feature maps, applying the plurality of attribution masks to copies of the input image to obtain a plurality of perturbed input images, obtaining a plurality of visualization maps based on confidence scores by inputting the plurality of perturbed copies of the input image to the CNN, and outputting an explanation map of the output determination of the CNN based on the plurality of visualization maps.

In another embodiment, the method further includes identifying the most deterministic feature maps with regard to the input image of each of the plurality of sets of feature maps as a corresponding subset of feature maps.

In another embodiment, identifying the subset of feature maps which are most deterministic with regard to the input image comprises calculating an average gradient of the model's confidence score with respect to the input image for each feature map. In yet another embodiment, a feature map is selected as most deterministic if its corresponding average gradient is greater than zero.

In another embodiment, the method further includes upscaling the feature maps of each subset to an original size of the input image to generate the plurality of attribution masks. In another embodiment, generating the plurality of attribution masks further comprises performing linear transformation on the attribution mask that normalizes the values in the range of [0, 1], and applying the generated attribution masks to the copies of the input image comprises performing perturbation of the copies of the input image based on each of the generated attribution masks by point-wise multiplication. In yet another embodiment, outputting the explanation map comprises performing a fusion process to combine feature information from the plurality of visualization maps.

In an embodiment of a method of the present disclosure, the fusion process to combine feature information of two visualization maps of the plurality of visualization maps comprises: normalizing a first visualization map of the plurality of visualization maps; performing unweighted addition of the normalized first visualization map and a normalized second visualization map to obtain a first result; performing Otsu-based binarization on the normalized second visualization map to eliminate features which are not present in the normalized first visualization map to obtain a second result; performing point-wise multiplication on the first result and the second result to obtain a third result; and performing the fusion process using the third result and a next visualization map of the plurality of visualization maps. In certain embodiments, the explanation map has a same dimensionality as the input image.

In another embodiment of the present disclosure, a machine-readable non-transitory medium having stored thereon machine-executable instructions for outputting an explanation map for an output determination of a convolutional neural network (CNN) based on an input image is disclosed, wherein the instructions comprise extracting a plurality of sets feature maps from a corresponding plurality of pooling layers of the CNN, obtaining a plurality of attribution masks based on subsets of the plurality of sets of feature maps, applying the plurality of attribution masks to copies of the input image to obtain a plurality of perturbed input images, obtaining a plurality of visualization maps based on confidence scores by inputting the plurality of perturbed copies of the input image to the CNN, and outputting an explanation map of the output determination of the CNN based on the plurality of visualization maps. In various embodiments of the machine-readable non-transitory medium, the stored machine-executable instructions may also include various other features similar to those of the embodiments of the method discussed above.

In another embodiment of the present disclosure, a system is disclosed for outputting an explanation map for an output determination of a convolutional neural network (CNN) based on an input image, the system comprising a display, one or more processors, and a memory having instructions stored thereon, which when executed by the one or more processors, cause the one or more processors to extract a plurality of sets of feature maps from a corresponding plurality of pooling layers of the CNN, obtain a plurality of attribution masks based on subsets of the plurality of sets of feature maps, apply the plurality of attribution masks to copies of the input image to obtain a plurality of perturbed input images, obtain a plurality of visualization maps based on confidence scores by inputting the plurality of perturbed copies of the input image to the CNN, and output, via the display, an explanation map of the output determination of the CNN based on the plurality of visualization maps. In various embodiments of the disclosed system, the stored instructions may also cause the one or more processors to perform various other features similar to those of the embodiments of the method discussed above.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other aspects and features of the present disclosure will become more apparent upon consideration of the following description of embodiments, taken in conjunction with the accompanying drawing figures.

FIGS. 8, 9, 10, 11, 12 depict testing results related to embodiments of the present disclosure.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system, method, and computer-readable medium for generating an explanation map for a convolutional neural network (CNN) through attribution-based input sampling and block-wise feature aggregation. While benefits of the invention are discussed with respect to CNN implementations with respect to image processing and classification, the disclosure is not limited thereto, and it will be appreciated that the invention is applicable to various implementations, including other CNN implementations such as audio and/or other data processing and classification.

Figure 3:
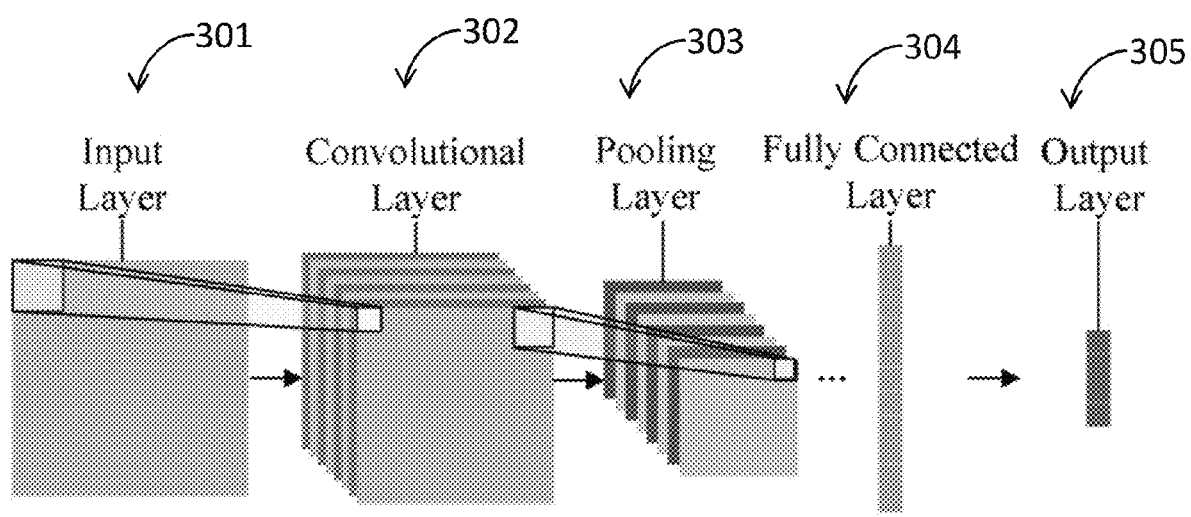
FIGS. 3, 4A, 4B are illustrations of various aspects of a convolutional neural network.

By way of background, a convolutional neural network (CNN) algorithm consists of multiple convolutional layers, pooling layers, activation layers, and fully-connected layers. FIG. 3 shows a generalized example of a CNN 300 comprising an input layer 301, convolutional layers 302, pooling layers 303, a fully connected layer 304, and an output layer 305 which includes a single vector of probability scores used in artificial intelligence decisions, such as object or facial recognition.

Figure 1:
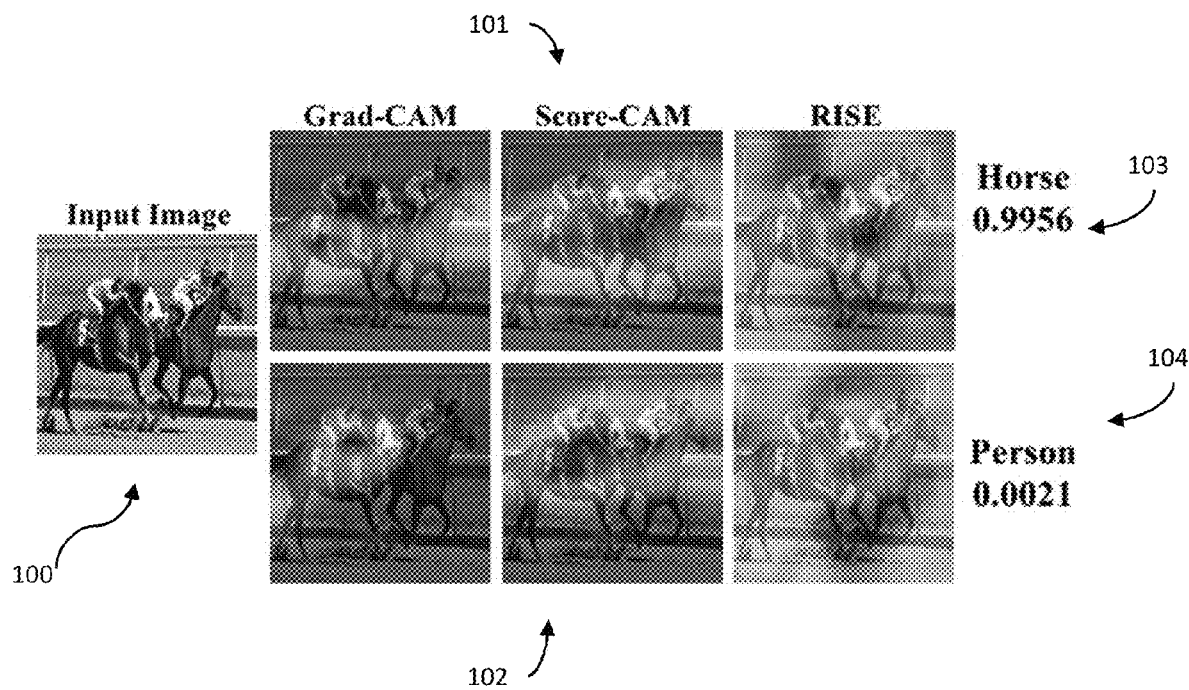
FIG. 1 are illustrations of various explanation maps for an input image generated according to the existing art.
Figure 2:
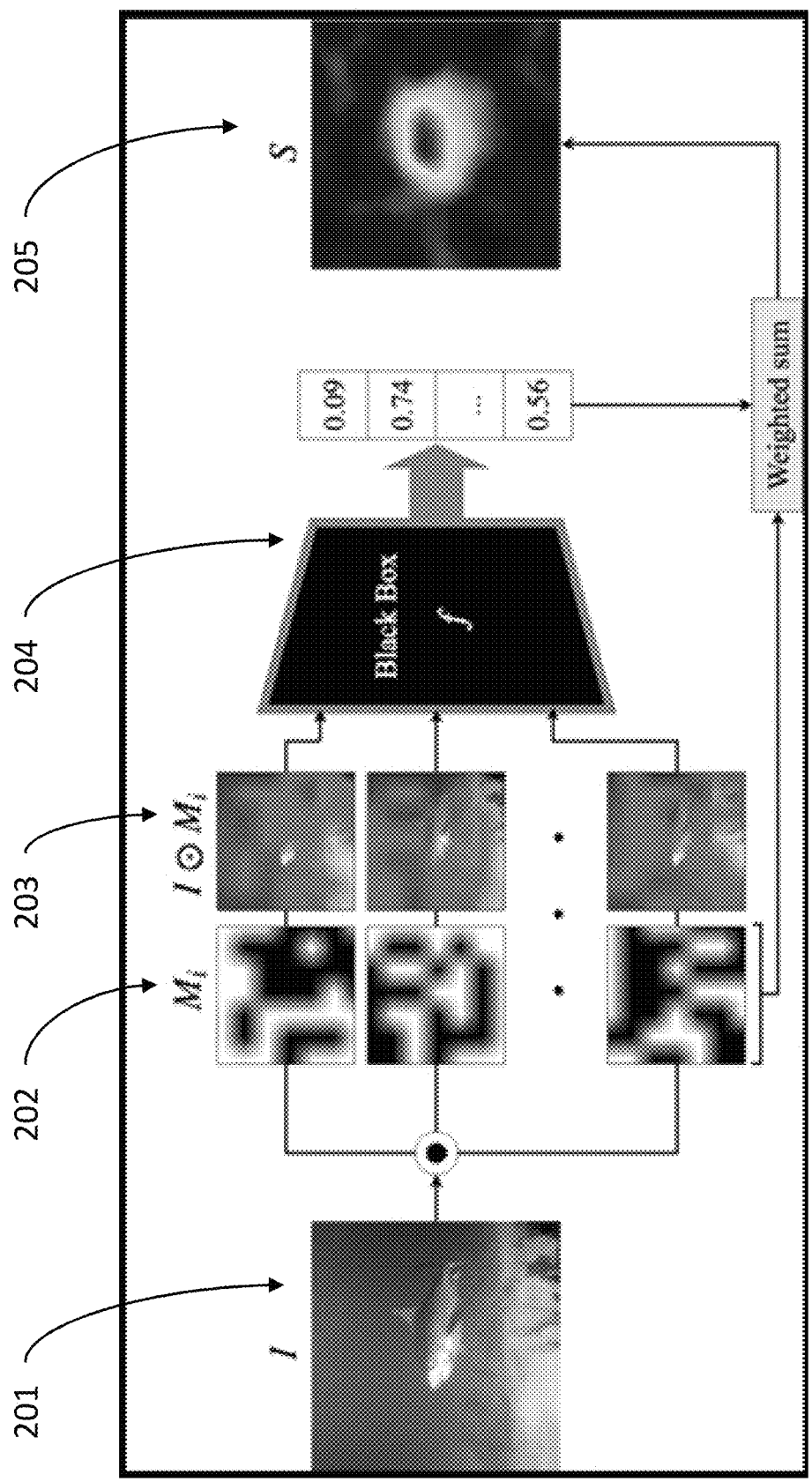
FIG. 2 is an illustration of a method for generating an explanation map for a CNN according to the existing art.

In a convolution layer 302, the original input 301, such as input image 100 of FIG. 1, is convolved with a set of filters (not depicted), otherwise referred to as kernels, designed to highlight specific characteristics of the input 301 to produce an output referred to as a feature map. While CNNs may be used in various applications such as image processing or audio processing, this disclosure will use examples related to image processing and recognition. However, it will be understood by those of ordinary skill that the disclosure may be applied to CNN implementations for use in various input types and purposes.

The convolution layer 302 may include an activation layer (not depicted) to enhance the nonlinear property of the network by introducing an activation function—such as a rectified linear unit (ReLU) activation function, wherein values that are less than or equal to zero become zero and all positive values remain the same.

The pooling layer 303 produces a scaled down version of the output feature map from the convolution layer 302. This is achieved by considering small groupings of pixel regions and applying a desired operational filter across the pixel grouping to produce a single representation. Some examples of pooling layer implementations, not depicted, include average pooling (computing the average of the elements present in the region of feature map covered by the filter), max pooling (selecting the maximum element from the region of the feature map covered by the filter), global pooling (reduces each channel in the feature map to a single value, including global average pooling and global max pooling), and the like, although these examples are not limiting.

Although not depicted in FIG. 3, most CNN implementations have multiple convolutional blocks, where each block includes a pooling layer at the end. Typically, the number of convolutional block and pooling layer combinations in any given CNN implementation is five, however the disclosure is not limited to this. The output scaled feature maps of the multiple convolution layers 302 and pooling layers 303 may be output to the input of fully connected layers 304 comprising a deep neural network, having an input layer, hidden layers, and an output layer (not depicted) for generating an output 305 for classifying the input image. The fully connected layer 304 provides a high-level reasoning by connecting each node in the layer to all activation nodes in the previous layer, and in many cases provides a traditional multi-layer perceptron neural network (MLP).

Based on the above background, details of the present disclosure follow below, involving CNN-specific operations that improve the fidelity and plausibility (in the view of reasoning) of explanation maps which provide understandable visualization of the decision making of a CNN. Such operations are provided with adaptive computational overhead for practical usage. The present disclosure does not rely on the randomized input sampling required in existing techniques such as RISE, as previously discussed. Instead, the present disclosure includes sampling the actual feature maps derived from multiple layers of the CNN, where such feature maps are "attribution-based", indicating that it provides the perspective of the model in various semantic levels.

In summary, the present disclosure includes four phases: in the first phase, Feature Map Extraction, multiple layers of the model are selected and a set of corresponding output feature maps are extracted. In the second phase, Feature Map Selection, for each set of feature maps a subset containing the most important feature maps is sampled. In the third phase, Attribution Mask Scoring, the selected feature maps are then processed to create sets of perturbation masks, referred to as attribution masks. The first three phases are applied to multiple layers of the CNN to output a 2-dimensional saliency map which is referred to as a "visualization map" for each layer. Such obtained visualization maps are aggregated in the fourth and last phase, Feature Aggregation, to reach the final explanation map.

Phase 1: Feature Map Extraction

In order to visualize multiple layers of the CNN to merge spatial information and semantic information discovered and utilized by the CNN-based model in its decision making, the most crucial layers for explaining the model's decisions must be identified and extracted for visualization. However, the sheer number of layers of a CNN have made this task difficult in the implementations of the existing art.

Regardless of architecture, all types of CNNs consist of convolutional blocks connected via pooling layers that aid the network to justify the existence of semantic instances. Each convolutional block is formed by cascading multiple layers, which may vary from a simple convolutional filter to more complex structures (e.g., bottleneck or inverted residual layers). However, the dimensions of their input and output signal are the same. Each pooling layer decreases the computational complexity of the feature maps output by the convolutional layers. Contextually, the pooling layers perform an abstraction of higher-level features present in the feature maps output by the convolutional layers by interpreting them as shapes, objects, and textures. Each pooling layer typically reduces the dimensionality of the feature maps before outputting them to the next convolutional block.

In detail, in a convolutional block, assuming the number of layers to be L, each ith layer can be represented with the function $f_i(.)$, where i={1, ..., L}. Denoting the input to each ith layer as $y_i$, the whole block can be mathematically described as F $(y_i)=f_L(y_L)$. For plain CNNs (e.g., VGG, GoogleNet), the output of each convolutional block can be represented with the equation below:

Equation 1:

$$F(y_1)=f_L(f_{L-1}(\ldots(f_1(y_1))))$$

Figure 4A:
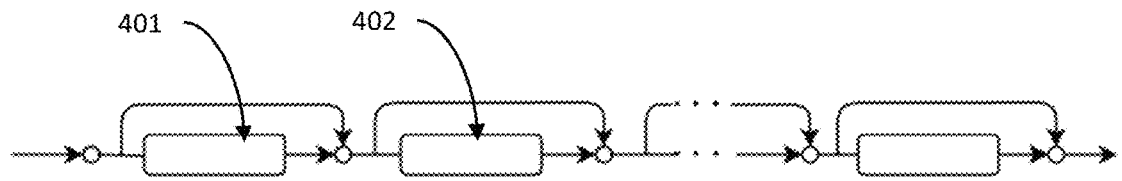

There are typically two types of convolutional networks. Plain CNNs, otherwise referred to as non-residual networks, refer to a typically shallow network where the output of each convolutional block is connected to a pooling layer, and the output of the pooling layer is input to the next convolutional block. These connections form a cascaded architecture. An example of a non-residual network is shown in FIG. 4A. In FIG. 4A, 401 and 402 are both convolutional blocks.

Figure 4B:
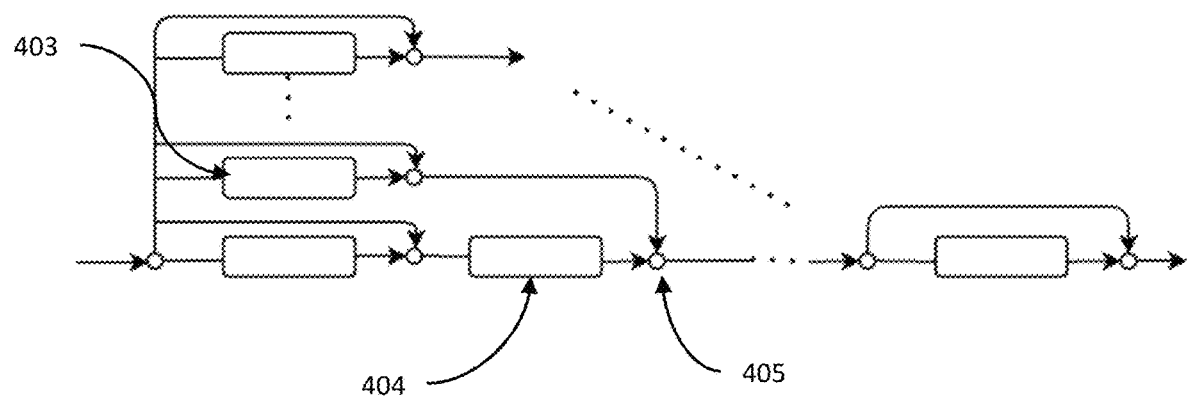

On the other hand, skip-connection CNNs, otherwise referred to as residual networks, refer to a network where the connection between one layer and the next layer are skipped, and/or connections exist between different convolutional layers. An example of an unraveled view of a residual network is shown in FIG. 4B. As shown in FIG. 4B, the output of a convolutional block 403, which is input to a pooling layer that is not depicted, skips a connection and is instead connected at 405 to the output a different convolutional block 404. In such residual networks that utilize skip connection layers to propagate the signals through a convolutional block, these types of networks can be viewed by the unraveled perspective, and the connection between the input and output may be formulated as follows:

Equation 2:

$$y_{i+1}=f_i(y_i)+y_i$$

and hence,

Equation 3:

$$F(y_1)=y_1+f_1(y_1)+\ldots+f_L(y_1+\ldots+f_{L-1}(y_{L-1}))$$

The unraveled architecture as in FIG. 4B is comprehensive enough to be generalized even to shallower CNN-based models that lack skip-connection layers. For plain networks, the layer functions $f_i$ can be decomposed to an identity function I and a residual function $g_i$ as follows:

Equation 4:

$$f_i(y_i)=I(y_i)+g_1(y_i)$$

Such a decomposition yields a similar equation form as equation 2, and consequently, equation 3.

Equation 5:

$$y_{i+1}=g_i(y_i)+y_i$$

It can be inferred from the unraveled view, as shown in FIG. 4B, that while feeding the model with an input, signals might not pass through all convolutional layers as they may skip some layers and be propagated to the next ones directly. However, this is not the case for pooling layers. Considering that a signal's dimensions are changed by a pooling layer, Equation 4 cannot be applied to such layers.

Based on this information, a determination may be made that most of the information in each model can be collected by probing the output of the pooling layers. This has been further evidenced by experiments in which error rates of a CNN were observed as particular layers of the model were removed individually, one at a time. It was found that a significant degradation in performance of the overall CNN resulted when a pooling layer was removed, where such degradation did not occur when removing a convolutional layer, showing that the performance and output of the pooling layers played a significant role in the performance of the model's decision making and general accuracy.

Thus, it is determined that by visualizing the output of the pooling layers, it is possible to track the way features are propagated through the convolutional blocks of the CNN. Therefore, in an embodiment of the present disclosure, the attribution masks for generating the explanation maps are derived from the feature maps output by the pooling layer in the last layer of each convolutional block for any given CNN.

Phase 2: Feature Map Selection

In the first phase, the model is fed with an input image to extract sets of feature maps from various layers of the model. In the second phase, Feature Map Selection, a subset of the most deterministic feature maps among each extracted set are selected, which are then processed to obtain corresponding sets of attribution masks, which are then used to perturb the input image in order to perform the "attribution-based input sampling."

In summary, identifying the most deterministic feature maps among the extracted sets of feature maps (output from the pooling layers, as discussed above), backward propagation is performed of the signal to a particular layer to score the average gradient of the model's confidence score to each of the feature maps. In this way, a value representing the correlation between each particular feature map and the original input image is obtained.

In an embodiment of the present disclosure, where the average gradient for a particular feature map is zero or a negative value, it is determined that the effect of the feature map is insignificant and may be disregarded, and thus the particular feature map is not selected for the subset. On the other hand, where the average gradient for a particular feature map is a positive value, it is determined that the effect of the feature map is high, and the particular feature map is selected for the subset. However, the disclosure is not limited to this, and various other embodiments may include other thresholds for selection and filtering of feature maps based on the corresponding average gradient values.

Once the positive-gradient feature maps are obtained, the feature maps are used to generate attribution masks by performing bilinear interpolation, otherwise referred to as bilinear texture mapping. As these positive-gradient feature maps will all be dimensionally smaller than the input image due to being output by the pooling layers, the positive-gradient feature maps are also upsized to the same size as the input image. This is followed by a linear transformation that normalizes the values in the mask to generate the final attribution mask used to perturb the input image.

In detail, assume $\Psi: I \rightarrow \mathbb{R}$ is a trained model that outputs a confidence score for a given input image, where I is the space of RGB images I={I|I : $\Lambda \rightarrow \mathbb{R}^3$}, and $\Lambda$={1, ..., H}×{1, ..., W} is the set of locations (pixels) in the image.

Given any model and image, the goal of an explanation algorithm is to reach an explanation map $S_{I,\Psi}(\lambda)$, that assigns an "importance value" to each location in the image ($\lambda \in \Lambda$). Also, let l be a layer containing N feature maps represented as $A^{(l)}_k (k=\{1, \ldots, N\})$ and the space of locations in these feature maps be denoted as $\Lambda^{(l)}$. These feature maps are collected by probing the feature extractor units of the model. The feature maps are formed in these units independently from the classifier part of the model. Thus, using the whole set of feature maps does not reflect the outlook of CNN's classifier.

To identify and reject the class-indiscriminative feature maps, the signal is partially backpropagated to the layer l to score the average gradient of the model's confidence score to each of the feature maps. These average gradient scores may be represented as follows:

Equation 6:

$$\alpha_k^{(l)} = \sum_{\lambda^{(l)} \in \Lambda^{(l)}} \frac{\partial \Psi(I)}{\partial A_k^{(l)}(\lambda^{(l)})}$$

The feature maps with corresponding non-positive average gradient scores—$\alpha^{(l)}_k$, tend to contain features related to other classes rather than the class of interest. Such feature maps are referred to as "negative-gradient." Instead, the set of attribution masks obtained from the "positive-gradient'" feature maps, $M^{(l)}_d$, is defined as:

Equation 7:

$$M^{(l)}_d = \{\Omega(A^{(l)}_k) | k \in \{1, \ldots, N\}, \alpha^{(l)}_k > \mu \times \beta^{(l)}\}$$

Where $\beta^{(l)}$ denotes the maximum average gradient recorded.

Equation 8:

$$\beta^{(l)} = \max_{k \in \{1, \ldots, N\}} (\alpha_k^{(l)})$$

In equation 7, $\mu \in \mathbb{R}_{\geq 0}$ is a threshold parameter that is 0 by default to discard negative-gradient feature maps while retaining only the positive-gradients.

Furthermore, $\Omega(.)$ represents a post-processing function that converts feature maps to attribution masks. This function contains a 'bilinear interpolation,' upsampling the feature maps to the size of the input image, followed by a linear transformation that normalizes the values in the mask in the range [0, 1].

Figure 5A:
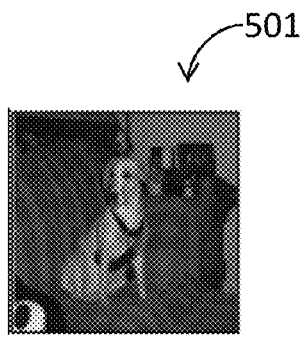
FIGS. 5A, 5B, 5C are illustrations of input images and attribution masks related to embodiments of the present disclosure.
Figure 5B:
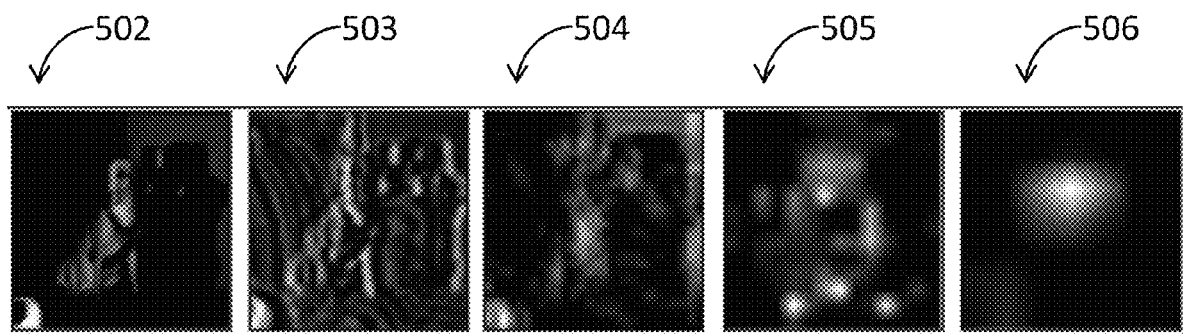

FIG. 5A and 5B depict examples of the generated attribution masks resulting from Phase 2's Feature Map Selection. The input image 501 is shown in FIG. 5A. Based on the above disclosure, the feature maps output by the pooling layer in the last layer of each convolutional block of the model are selected in Phase 1. Then in Phase 2, the signal is partially backpropagated to a particular layer of each feature map to score the average gradient of the model's confidence score to the corresponding feature map in order to obtain a subset of the positive-gradient feature maps for each pooling layer output. The subset is processed and upsampled, and attribution masks such as the examples 502-506 of FIG. 5B are generated.

As shown in FIG. 5B, the attribution masks may have detectable features at various levels of abstraction depending on the pooling layer of the extracted corresponding feature map. Since the convolutional layers and pooling layers serve to further abstract the various edges, shapes, textures, and the like, with each convolutional block, the attribution masks based on feature maps extracted from a fifth or fourth pooling layer, such as 506, 505, respectively, may have very little distinguishable features of the input image 501, in comparison to attribution masks based on earlier pooling layers such as 502, 503.

Figure 5C:
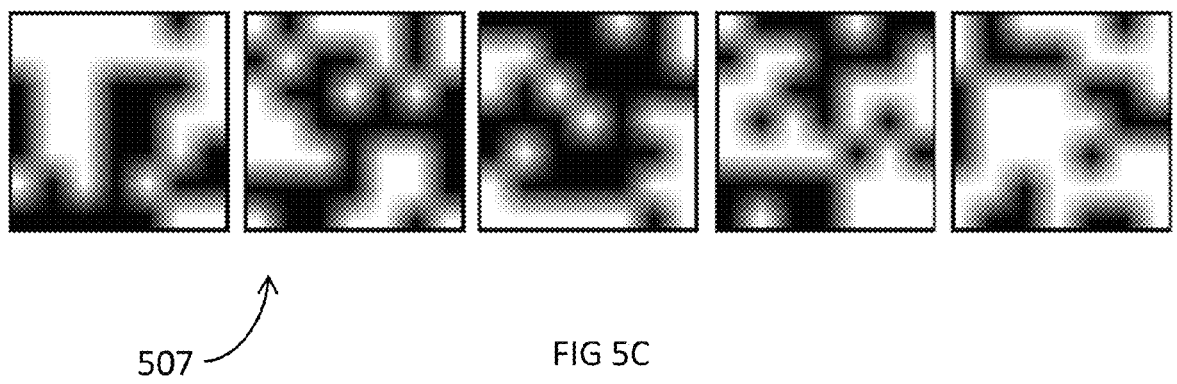

By contrast, FIG. 5C depicts examples of perturbation masks 507 utilized for methods of the existing art, such as RISE, previously discussed. It can be seen in comparison that the attribution masks 502-506 of the present disclosure, when applied to the input image 501, will result in perturbed input images to the CNN for explanation which will leave the main features, edges, shapes, textures, etc. of the input image 501 unmasked, thereby resulting in more accurate and efficient explanation map generation as compared to the randomly generated perturbation masks 507.

Phase 3: Attribution Mask Scoring

Based on the attribution masks output from Phase 2 above, the attribution masks are then applied to copies of the input image using a pointwise multiplication process, and the perturbed images are input to the CNN to generate visualization maps based on their respective confidence scores. Specifically, the first three phases are applied to multiple layers of the CNN to output a 2-dimensional visualization map for each layer.

In detail, considering the same notations as the previous section, the confidence scores observed for the copies of an image masked with a set of binary masks (M : $\Lambda \to \{0,1\}$) are used to form the explanation map by, Equation 9:

$$S_{I,\Psi}(\lambda) = \mathbb{E}_M[\Psi(I \odot m) | m(\lambda)=1]$$

where $I \odot m$ denotes a masked image obtained by pointwise multiplication between the input image and a mask $m \in M$. The representation of equation 9 can be modified to be generalized for sets of smooth masks (M : $\Lambda \to [0,1]$). Hence, Equation 9 may be reformatted as:

Equation 10:

$$S_{I,\Psi}(80) = \mathbb{E}_M[\Psi(I \odot m) \cdot C_m(\lambda)]$$

where the term $C_m(\lambda)$ indicates the contribution amount of each pixel in the masked image. Setting the contribution indicator as $C_m(\lambda) = m(\lambda)$, makes equation 10 equivalent to equation 9. These scores may be normalized according to the size of the perturbation masks to decrease the assigned reward to the background pixels when a high score is reached for a mask with too many activated pixels. Thus, this term may be defined as:

Equation 11:

$$C_m(\lambda) = \frac{m(\lambda)}{\sum_{\lambda \in \Lambda} m(\lambda)}$$

Such a formulation may increase the concentration on smaller features, particularly when multiple objects (either from the same instance or different ones) are present in an image.

Putting block-wise layer selection policy and attribution mask selection strategy together with an existing framework such as from the RISE method, for each CNN containing B convolutional blocks, the last layer of each block is indicated as $l_b \in \{1, \ldots, B\}$. Using equations 10 and 11, corresponding visualization maps may be formed for each of these layers by:

Equation 12:

$$V^{(lb)}_{I,\Psi}(\lambda) = \mathbb{E}_{M_d^{(lb)}}[\Psi(I[m) \cdot C_m(\lambda)]$$

Phase 4: Feature Aggregation

Figure 6:
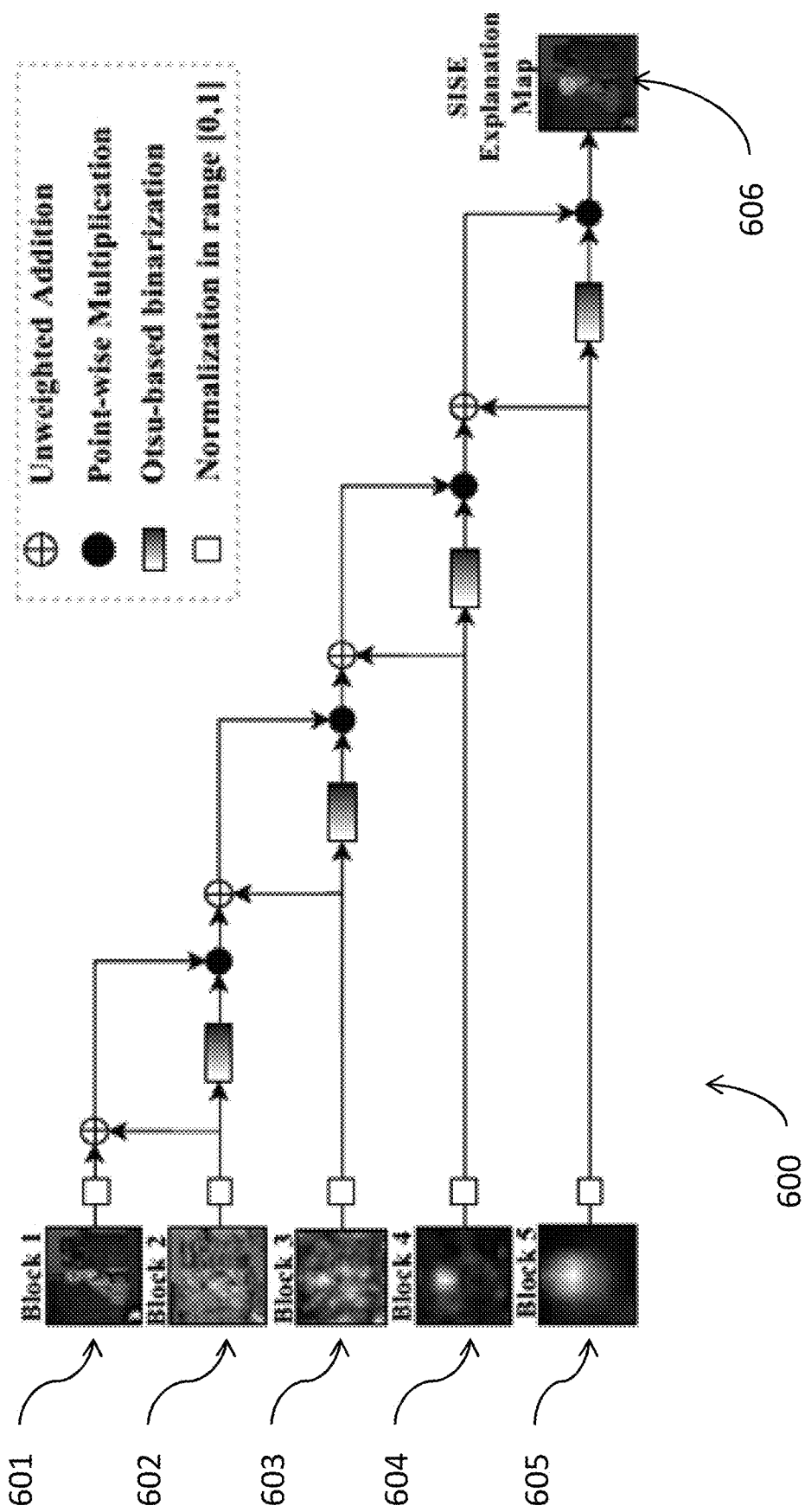
FIG. 6 is an illustration of a cascading fusion module according to embodiments of the present disclosure.

In the fourth phase, the flow of features from low-level to high-level blocks may be tracked using a fusion module 600, as shown in FIG. 6. The inputs to the fusion module may be the visualization layers 601-605 obtained from Phase Three, above. The fusion module is responsible for correcting spatial distortions caused by upsampling coarse feature maps to higher dimensions and refining the localization of attributions derived from the model.

Specifically, with respect to FIG. 6, the fusion module includes cascaded fusion blocks. First, an unweighted addition is performed for two consecutive visualization layers which aggregates and sums up the information in the visualization layers—representing two consecutive convolutional blocks of the network. Then, a combination of otsu-based binarization and pointwise multiplication is performed, whereby features that are present in a current block, but are discarded and/or not included in a next block, are eliminated. The features that are absent in the latter visualization map are removed from the collective information by masking the output of the addition block with a binary mask indicating the activated regions in the latter visualization map.

As an example, referring to block 3, the visualization map 603 may include some shapes or edges which correspond to background image information, such as a sofa or table depicted in the background of the image of the dog of the input image (see 501 of FIG. 5). However, as such information of the background image is not included in the visualization map 604 of block 4, the otsu-based binarization and pointwise multiplication operations act to remove such information from visualization map 603. As shown in FIG. 6, the above operations are iterated for all visualization maps of all of the blocks, resulting in an explanation map 606 which represents and emphasizes features that are common and present in all of the input visualization maps 601-605. In this way, the cascading fusion blocks allow the features determining the model's prediction to be represented in a more focused manner while the inexplicit features are discarded.

With reference to the fusion module 600, it is noted that in some embodiments a weight may be applied to the visualization maps to focus on the features prevalent in either the earlier or later blocks. However, in the embodiment shown in FIG. 6, no weighting is included in the input of the visualization maps 601-605 and generation of the final explanation map 606.

As discussed, the resulting explanation map 606 is a 2D image having the same dimensionality as the input image, where regions of the image are indicated with different colors or patterns to indicate to a user the portions of the input image which contribute to the final decision making of the CNN in an image classification task, for example.

Figure 7:
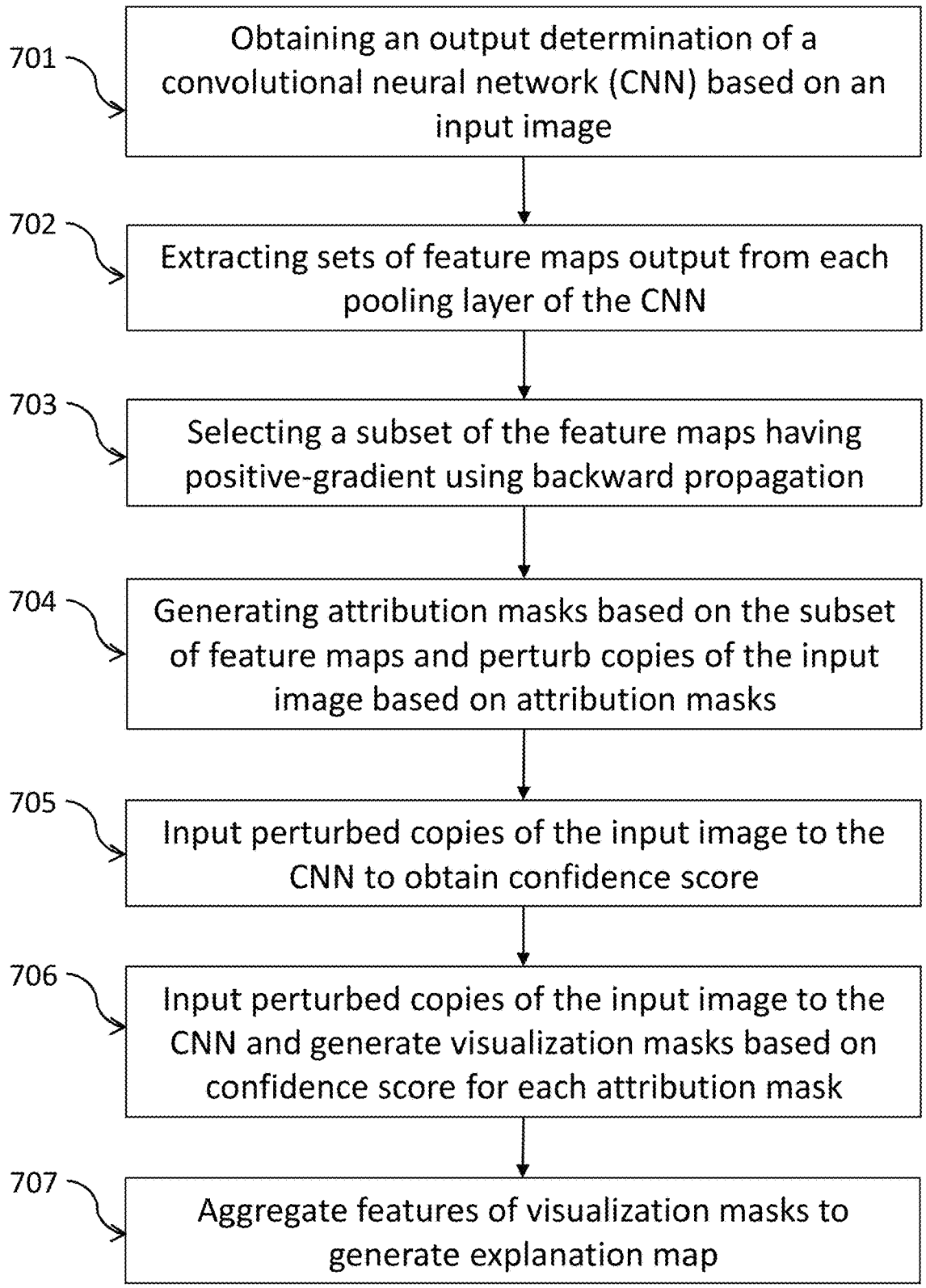
FIG. 7 is a flowchart illustrating a method according to embodiments of the present disclosure.

Referring now to FIG. 7, a flowchart showing an example of a method 700 of the present disclosure is shown. Starting at 701, an input image is input to a CNN to obtain a classification determination. For example, the input image 501 shown in FIG. 5 may be input to a CNN to obtain a classification result of "dog" having a certain confidence score of the CNN. At 702, sets of the feature maps that are output from each of the pooling layers of the CNN are extracted. As discussed with respect to Phase 1, most of the information in each model can be collected by probing the output of the pooling layers, thus visualizing the output of the pooling layers allows for tracking the way features are propagated through the convolutional blocks of the CNN.

Based on the extracted sets of feature maps, at 703, a subset of each of the pooling layer sets are selected as being the most deterministic feature maps among each extracted set. As discussed with respect to Phase 2, backward propagation is performed to a particular layer to score the average gradient of the model's confidence score to each of the feature maps, resulting in a value representing the correlation between each particular feature map and the original input image. The subset is selected based on the gradient of each feature set, where an example of the selection threshold may selection of only positive gradient feature maps.

At 704, attribution masks are generated by upsampling and processing the subset of feature maps, as shown for example in FIG. 5B. The attribution masks are then applied to copies of the input image and the perturbed input image is input to the CNN, where the confidence score of the CNN with the perturbed input is used to generate visualization maps for each layer of the CNN, shown at 706.

Finally at 707, the visualization maps are input to a fusion module, for example as discussed with respect to FIG. 6, to combine features of the visualization maps to generate the final explanation map. The final explanation map may represent a heatmap, for example shown at 606 of FIG. 6, showing the regions of the input image which have the highest degree of contribution to the decision making of the CNN, which is easily interpretable by a user.

Testing Results

Based on the embodiments of the present disclosure discussed above, results of experiments showing advantages over the existing art are provided in the following discussion. The performance of an implementation of the present disclosure has been tested on shallow and deep CNNs, including VGG16, ResNet-50, and ResNet-101 architectures. To conduct the experiments, PASCAL VOC 2007 and Severstal datasets were employed. The former is a popular object detection dataset containing 4,952 test images belonging to 20 object classes. As images with many small object occurrences and multiple instances of different classes are prevalent in this dataset, it would be difficult for an explanation artificial intelligence algorithm to perform well on the whole dataset. The latter is an industrial steel defect detection dataset created for anomaly detection and steel defect segmentation problems, which was reformatted into a defect classification dataset instead, containing 11,505 test images from 5 different classes, including one normal class and four different defects classes. Class imbalance, intraclass variation, and interclass similarity were the main challenges of this recast dataset.

Experiments conducted on the PASCAL VOC 2007 dataset were evaluated on its test set with a VGG16, and a ResNet50 model from the TorchRay library, both trained for multi-label image classification. The top-5 accuracies of the models on the test set are 93.29% and 93.09%, respectively. On the other hand, for conducting experiments on Severstal, a ResNet-101 model was trained (with a test accuracy of 86.58%) on the recast dataset to assess the performance of the present disclosure in the task of visual defect inspection. To recast the Severstal dataset for classification, the training and test images were cropped into patches of size 256×256. In the evaluations, a balanced subset of 1,381 test images belonging to defect classes labeled as 1, 2, 3, and 4 was chosen. The embodiments of the present disclosure were implemented on Keras and the parameter was set to its default value, 0.

Figure 8:
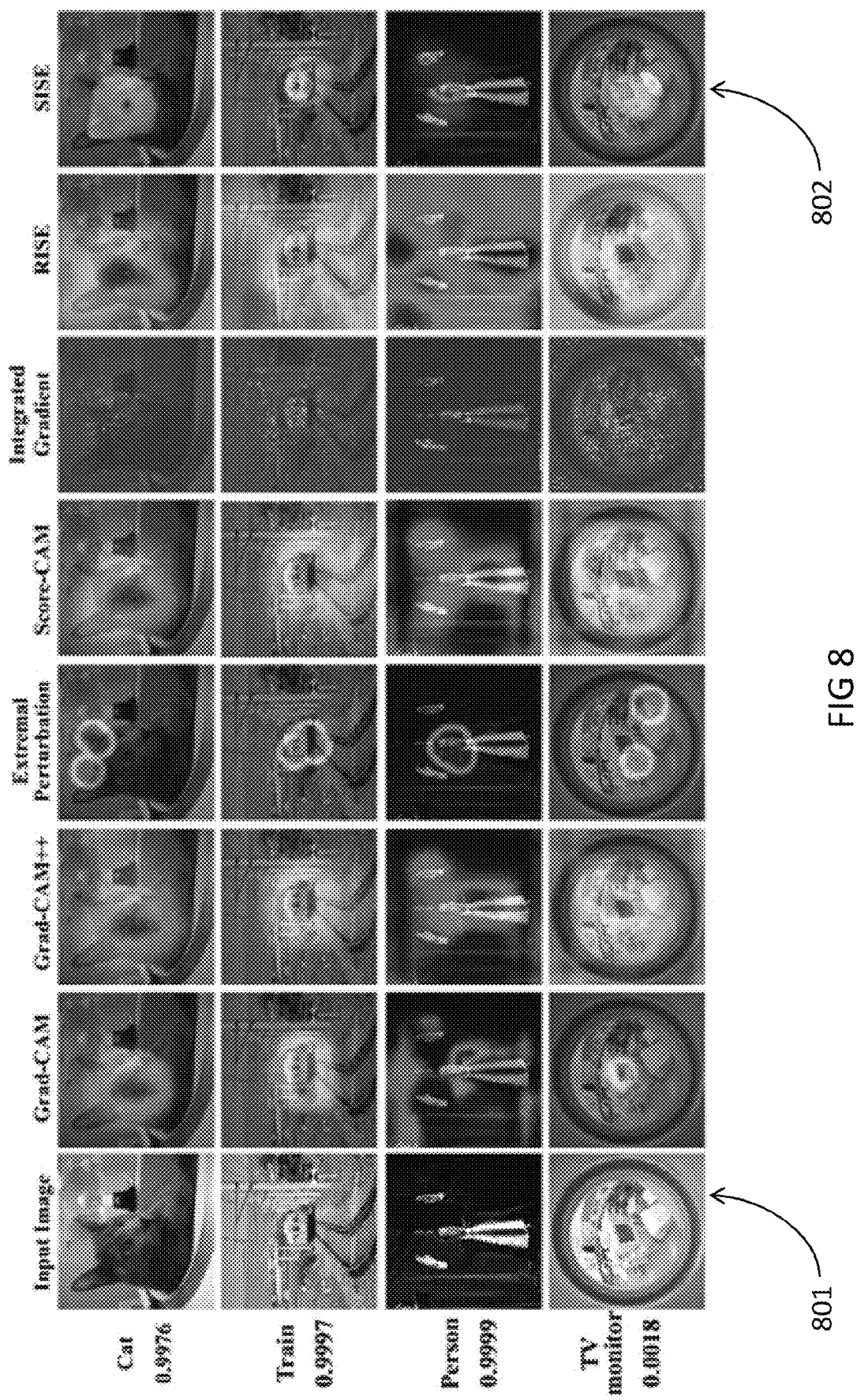
Figure 9:
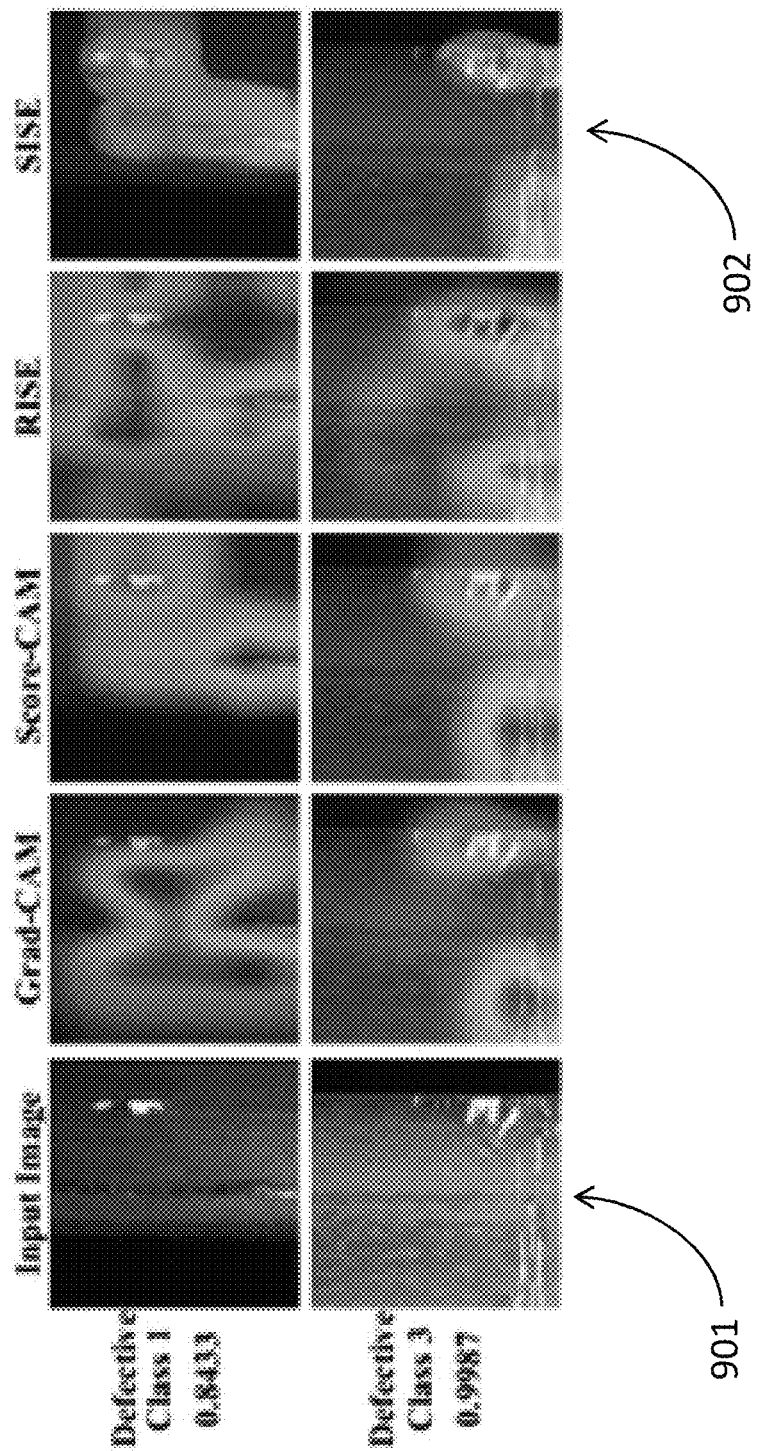

With respect to qualitative results of testing, implementation of the present disclosure was compared with other existing art methods on sample images from the Pascal dataset, as shown in FIG. 8, and the Severstal dataset, as shown in FIG. 9. Referring to FIGS. 8 and 9, the various explanation maps generated by known existing methods are compared to the explanation map generated by implementation of the present disclosure 802, 902. Images with both normal-sized and small object instances are included in the testing along with their corresponding confidence scores. For example, in FIG. 8, an input image of a cat shown in a large size within the image, or an input image of a train on train tracks from a long distance perspective, resulting in a small image of the train within the input image. As shown in FIG. 8, the explanation maps resulting from implementation of the present disclosure includes a heatmap wherein the "hot", or high impact areas of the heatmap, are smaller and more focused on the areas of the input image which are used by the CNN for the classification output. Even for defective classifications, as shown in FIG. 9, the resulting explanation map provides more information to a user as to the network's classification determination. This provides more useful information to the user in evaluating and understanding the decision making of the network.

Figure 10:
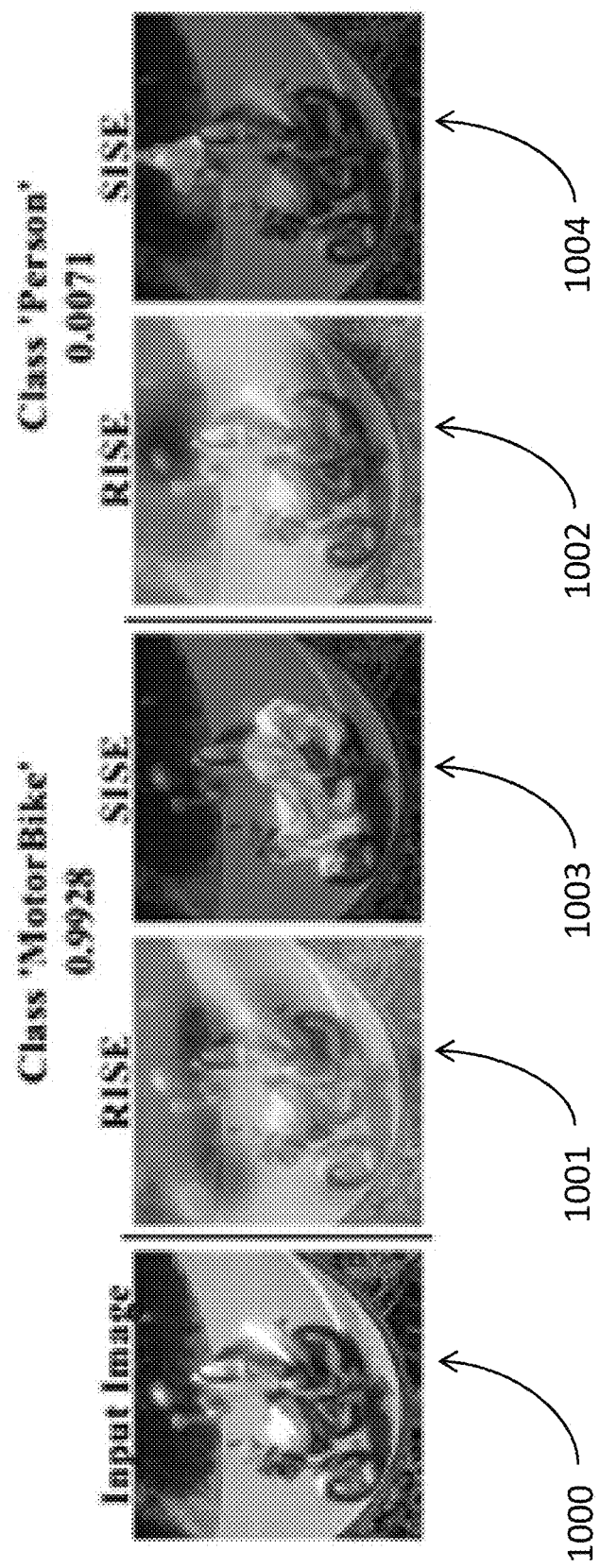

This is further shown in FIG. 10, which shows the class discriminative ability of the present disclosure given an input image having multi-class classification results. FIG. 10 shows an input image 1000 which includes an image of both a person and a motorbike, resulting in two classification results of "person" and "motorbike" with confidence scores of 0.9928 and 0.0071, respectively. Given the input image 1000, existing methods of the prior art, such as RISE, generate explanation maps 1001, 1002 which lack class discriminative ability. The RISE explanation maps 1001, 1002 include a heat map that is not focused on particular or specific features or regions of the input image, and thus the explanation map does not provide much useful information to a user in gleaning insight on the network's classification decision.

By contrast, the explanation maps 1003, 1004 of the present disclosure are clearly indicative of the exact regions of the input image which contribute the most to the network's classification decision where, for the classification "motorbike", the hot areas of the heatmap clearly correspond to the features of the motorcycle, and where, for the classification "person", the hot areas of the heatmap clearly correspond to the features of the person's head, face, hand, and arm areas. Thus, the superior ability of embodiments of the present disclosure in discriminating the explanations of various classes in comparison with existing methods, such RISE for example, can be clearly appreciated.

With respect to quantitative results of testing, evaluation of results is categorized into "ground truth-based" and "model truth-based" metrics. The former is used to justify the model by assessing the extent to which the algorithm satisfies the users by providing visually superior explanations, while the latter is used to analyze the model's behavior by assessing the faithfulness of the algorithm and its correctness in capturing the attributions in line with the model's prediction procedure. The results of existing methods of the prior art in comparison to those of the present disclosure (SISE) are shown in FIG. 11. The utilized metrics are discussed below.

Ground truth-based Metrics: The explanation algorithms of the existing art are compared with SISE based on three distinct ground-truth based metrics to justify the visual quality of the explanation maps generated by the present disclosure. Denoting the ground-truth mask as G and the achieved explanation map as S, the evaluation metrics used are as follows:

"Energy-Based Pointing Game (EBPG)" evaluates the precision and denoising ability of Explainable AI algorithms. Extending the traditional Pointing Game, EBPG considers all pixels in the resultant explanation map S for evaluation by measuring the fraction of its energy captured in the corresponding ground truth G, as $$EBPG = \frac{\|S \odot G\|_1}{\|S\|_1}.$$

"mIoU" analyses the localization ability and meaningfulness of the attributions captured in an explanation map. In the testing, the top 20% pixels highlighted in each explanation map S are selected and the mean intersection over union is computed with their corresponding ground-truth masks.

"Bounding box (Bbox)" is taken into account as a size-adaptive variant of mIoU. Considering N as the number of ground truth pixels in G, the Bbox score is calculated by selecting the top N pixels in S and evaluating the corresponding fraction captured over G.

Model truth-based metrics: To evaluate the correlation between the representations of the present disclosure and the model's predictions, model-truth based metrics are employed to compare implementations of the present disclosure with the methods of the existing art. As visual explanation algorithms' main objective is to envision the model's perspective for its predictions, these metrics are considered of higher importance.

"Drop %" and "Increase %", may be interpreted as an indicator of the positive attributions missed and the negative attribution discarded from the explanation map, respectively. Given a model $\Psi(.)$, an input image $I_i$ from a dataset containing K images, and an explanation map $S(I_i)$, the Drop/Increase % metric selects the most important pixels in $S(I_i)$ to measure their contribution towards the model's prediction. A threshold function $T(.)$ is applied on $S(I_i)$ to select the top 15% pixels that are then extracted from $I_i$ using pointwise multiplication and fed to the model. The confidence scores on such perturbed images are then compared with the original score, according to the equations:

$$\text{Drop \%} = \frac{1}{K}\sum_{k=1}^{K} \frac{\max(0, \Psi(I_i) - \Psi(I_i \odot T(I_i)))}{\Psi(I_i)} \times 100$$

$$\text{Increase \%} = \sum_{k=1}^{K} \text{sign}(\Psi(I_i \odot T(I_i)) - \Psi(I_i))$$

The experimental results discussed above with respect to FIGS. 8, 9, 10 demonstrate the resolution, and concreteness of explanation maps generated according to the present disclosure, which is further supported by ground truth-based evaluation metrics as in FIG. 11. Also, model truth-based metrics in FIGS. 11 and 12 prove the present disclosure's supremacy in highlighting the evidence, based on which the model makes a prediction. (In FIGS. 11 and 12, a lower Drop % is better, and a higher Increase % is better). Similar to the CAM-based methods, the output of the last convolutional block plays the most critical role in the present disclosure.

However, by considering the intermediate layers based on the block-wise layer selection, SISE's advantageous properties are enhanced. Furthermore, utilizing attribution-based input sampling instead of a randomized sampling, ignoring the unrelated feature maps, and modifying the linear combination step dramatically improves the visual clarity and completeness offered by the embodiments according to the present disclosure.

In addition to the above performance evaluations, a runtime test is also provided to compare the complexity of the present disclosure with the existing methods, specifically using a Tesla T4 GPU with 16 GB of memory and the ResNet-50 model. Reported runtimes were averaged over 100 trials using random images from the PASCAL VOC 2007 test set. Other than GRAD-CAM and GRAD-CAM++ which achieved the best runtimes—only due to the fact that these algorithms only require a single forward pass and a single backward pass—Extremal Perturbation recorded the longest runtime, 78.37 seconds, since it optimizes numerous variables. In comparison with RISE, which has a runtime of 26.08 seconds, SISE of the present disclosure runs in 9.21 seconds.

Further, while RISE of the existing art uses around 8000 random masks to operate on a ResNet-50 model, SISE of the present disclosure uses around 1900 attribution masks with $\mu$ set to 0, out of a total of 3904 feature maps initially extracted from the same ResNet-50 model before negative-gradient feature maps were removed. The difference in the number of masks allows SISE to operate in around 9.21 seconds. To analyze the effect of reducing the number of attribution masks on SISE's performance, an ablation study is provided. By changing $\mu$ to 0.3, a scanty variation in the boundary of explanation maps can be noticed while the runtime is reduced to 2.18 seconds. This shows that ignoring feature maps with low gradient values does not considerably affect SISE outputs since they tend to be assigned low scores in the third phase of SISE anyway. By increasing $\mu$ to 0.5, a slight decline in the performance was recorded along with a runtime of just 0.65 seconds.

Figure 13:
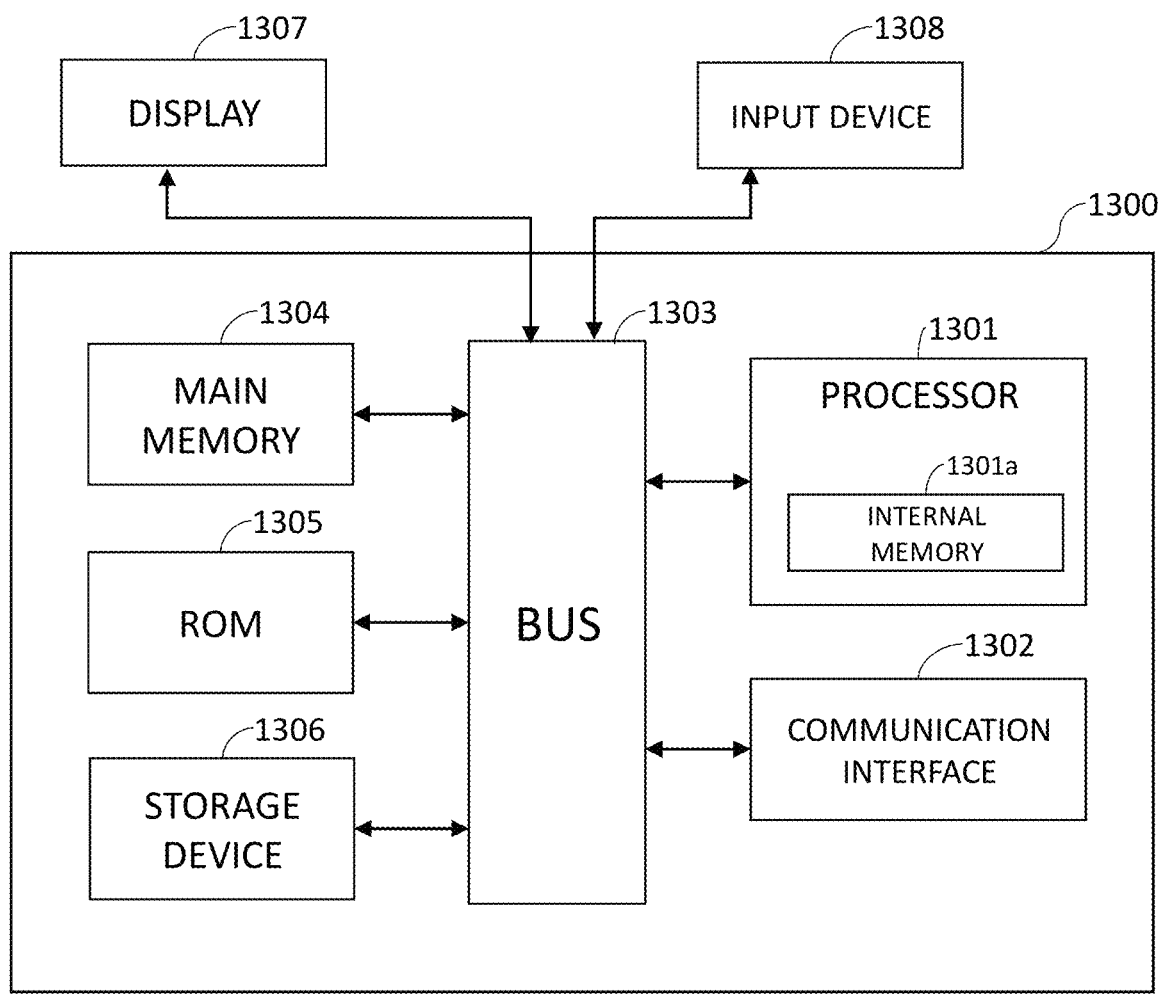
FIG. 13 is an illustration of a device related to implementation of embodiments of the present disclosure.

Referring now to FIG. 13, an illustration of an example computer 1300 is provided which may be used to embody, implement, execute, or perform embodiments of the present disclosure. In selected embodiments, the computer 1300 may include a bus 1303 (or multiple buses) or other communication mechanism, a processor 1301, processor internal memory 1301a, main memory 1304, read only memory (ROM) 1305, one or more additional storage devices 1306, and/or a communication interface 1302, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1303 or other communication mechanism, including multiple such buses or mechanisms, may support communication of information within the computer 1300. The processor 1301 may be connected to the bus 1303 and process information. In selected embodiments, the processor 1301 may be a specialized or dedicated microprocessor configured to perform particular tasks in accordance with the features and aspects disclosed herein by executing machine-readable software code defining the particular tasks. In some embodiments, multiple processors 1301 may be provided with each processing unit dedicated to a particular specialized task, such as graphics processing or artificial intelligence related processing.

Main memory 1304 (e.g., random access memory—or RAM—or other dynamic storage device) may be connected to the bus 1303 and store information and instructions to be executed by the processor 1301. Processor 1301 may also include internal memory 1301a, such as CPU cache implemented by SRAM, for storing data used for executing instructions. Utilization of internal memory 1301a may optimize data and memory management by reducing memory bandwidth usage with main memory 1304. Although FIG. 13 depicts internal memory 1301a as a component of processor 1301, it will be understood that embodiments are included wherein internal memory 1301a is a separate component apart from processor 1301. Main memory 1304 may also store temporary variables or other intermediate information during execution of such instructions.

ROM 1305 or some other static storage device may be connected to a bus 1303 and store static information and instructions for the processor 1301. An additional storage device 1306 (e.g., a magnetic disk, optical disk, memory card, or the like) may be connected to the bus 1303. The main memory 1304, ROM 1305, and the additional storage device 1306 may include a non-transitory computer-readable medium holding information, instructions, or some combination thereof, for example instructions that when executed by the processor 1301, cause the computer 1300 to perform one or more operations of a method as described herein. A communication interface 1302 may also be connected to the bus 1303. A communication interface 1302 may provide or support two-way data communication between a computer 1300 and one or more external devices (e.g., other devices contained within the computing environment).

In selected embodiments, the computer 1300 may be connected (e.g., via a bus) to a display 1307. The display 1307 may use any suitable mechanism to communicate information to a user of a computer 1300. For example, the display 1307 may include or utilize a liquid crystal display (LCD), light emitting diode (LED) display, projector, or other display device to present information to a user of the computer 1300 in a visual display. One or more input devices 1308 (e.g., an alphanumeric keyboard, mouse, microphone, stylus pen) may be connected to the bus 1303 to communicate information and commands to the computer 1300. In selected embodiments, one input device 1308 may provide or support control over the positioning of a cursor to allow for selection and execution of various objects, files, programs, and the like provided by the computer 1300 and displayed by the display 1307.

The computer 1300 may be used to transmit, receive, decode, display, or the like one or more image or video files. In selected embodiments, such transmitting, receiving, decoding, and displaying may be in response to the processor 1301 executing one or more sequences of one or more instructions contained in main memory 1304. Such instructions may be read into main memory 1304 from another non-transitory computer-readable medium (e.g., a storage device).

Execution of sequences of instructions contained in main memory 1304 may cause the processor 1301 to perform one or more of the procedures or steps described herein. In selected embodiments, one or more processors in a multi-processing arrangement may also be employed to execute sequences of instructions contained in main memory 1304. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1301, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1302 may provide or support external, two-way data communication to or via a network link. For example, a communication interface 1302 may be a wireless network interface controller or a cellular radio providing a data communication network connection. Alternatively, a communication interface 1302 may comprise a local area network (LAN) card providing a data communication connection to a compatible LAN. In any such embodiment, a communication interface 1302 may send and receive electrical, electromagnetic, or optical signals conveying information.

A network link may provide data communication through one or more networks to other data devices (e.g., other computers such as 1300, or terminals of various other types). For example, a network link may provide a connection through a local network of a host computer or to data equipment operated by an Internet Service Provider (ISP). An ISP may, in turn, provide data communication services through the Internet. Accordingly, a computer 1300 may send and receive commands, data, or combinations thereof, including program code, through one or more networks, a network link, and communication interface 1302. Thus, the computer 1300 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for outputting an explanation map for an output determination of a convolutional neural network (CNN) based on an input image, the method comprising:
   extracting a plurality of sets of feature maps from a corresponding plurality of pooling layers of the CNN;
   obtaining a plurality of attribution masks based on subsets of the plurality of sets of feature maps;
   applying the plurality of attribution masks to copies of the input image to obtain a plurality of perturbed input images;
   obtaining a plurality of visualization maps based on confidence scores by inputting the plurality of perturbed copies of the input image to the CNN; and
   outputting an explanation map of the output determination of the CNN based on the plurality of visualization maps,
   wherein outputting the explanation map comprises performing a fusion process to combine feature information from the plurality of visualization maps, and
   wherein the fusion process to combine feature information of visualization maps of the plurality of visualization maps comprises:
   normalizing a first visualization map of the plurality of visualization maps;
   performing unweighted addition of the normalized first visualization map and a normalized second visualization map to obtain a first result;
   performing Otsu-based binarization on the normalized second visualization map to eliminate features which are not present in the normalized first visualization map to obtain a second result;
   performing point-wise multiplication on the first result and the second result to obtain a third result; and
   performing the fusion process using the third result and a next visualization map of the plurality of visualization maps.

2. The method of claim 1, further comprising identifying feature maps as being a subset of most deterministic feature maps with regard to the input image of each of the plurality of sets of feature maps as a corresponding subset of feature maps.

3. The method of claim 2, wherein identifying the most deterministic feature maps comprises calculating an average gradient of the model's confidence score with respect to the input image for each feature map, and
   wherein a feature map is identified as most deterministic based on the feature map having a corresponding average gradient that is greater than zero.

4. The method of claim 2, further comprising upscaling the feature maps of each subset to an original size of the input image to generate the plurality of attribution masks.

5. The method of claim 4, wherein generating the plurality of attribution masks further comprises performing linear transformation on the attribution mask that normalizes the values in the range of [0, 1].

6. The method of claim 1, wherein applying the generated attribution masks to the copies of the input image comprises performing perturbation of the copies of the input image based on each of the generated attribution masks by point-wise multiplication.

7. The method of claim 1, wherein the explanation map has a same dimensionality as the input image.

8. A machine-readable non-transitory medium having stored thereon machine-executable instructions for outputting an explanation map for an output determination of a convolutional neural network (CNN) based on an input image, the instructions comprising:
  extracting a plurality of sets feature maps from a corresponding plurality of pooling layers of the CNN;
  obtaining a plurality of attribution masks based on subsets of the plurality of sets of feature maps;
  applying the plurality of attribution masks to copies of the input image to obtain a plurality of perturbed input images;
  obtaining a plurality of visualization maps based on confidence scores by inputting the plurality of perturbed copies of the input image to the CNN; and
  outputting an explanation map of the output determination of the CNN based on the plurality of visualization maps,
  wherein outputting the explanation map comprises performing a fusion process to combine feature information from the plurality of visualization maps, and
  wherein the fusion process to combine feature information of visualization maps of the plurality of visualization maps comprises:
    normalizing a first visualization map of the plurality of visualization maps;
    performing unweighted addition of the normalized first visualization map and a normalized second visualization map to obtain a first result;
    performing Otsu-based binarization on the normalized second visualization map to eliminate features which are not present in the normalized first visualization map to obtain a second result;
    performing point-wise multiplication on the first result and the second result to obtain a third result; and
    performing the fusion process using the third result and a next visualization map of the plurality of visualization maps.

9. The machine-readable non-transitory medium of claim 8, wherein the instructions further comprise identifying feature maps as being a subset of most deterministic feature maps with regard to the input image of each of the plurality of sets of feature maps as a corresponding subset of feature maps.

10. The machine-readable non-transitory medium of claim 9, wherein identifying the most deterministic feature maps comprises calculating an average gradient of the model's confidence score with respect to the input image for each feature map, and
  wherein a feature map is identified as most deterministic based on the feature map having a corresponding average gradient that is greater than zero.

11. The machine-readable non-transitory medium of claim 9, wherein the instructions further comprise upscaling the feature maps of each subset to an original size of the input image to generate the plurality of attribution masks.

12. The machine-readable non-transitory medium of claim 11, wherein generating the plurality of attribution masks further comprises performing linear transformation on the attribution mask that normalizes the values in the range of [0, 1].

13. The machine-readable non-transitory medium of claim 8, wherein applying the generated attribution masks to the copies of the input image comprises performing perturbation of the copies of the input image based on each of the generated attribution masks by point-wise multiplication.

14. The machine-readable non-transitory medium of claim 8, wherein the explanation map has a same dimensionality as the input image.

15. A system for outputting an explanation map for an output determination of a convolutional neural network (CNN) based on an input image, the system comprising:
  a display;
  one or more processors; and
  a memory having instructions stored thereon, which when executed by the one or more processors, cause the one or more processors to:
  extract a plurality of sets of feature maps from a corresponding plurality of pooling layers of the CNN;
  obtain a plurality of attribution masks based on subsets of the plurality of sets of feature maps;
  apply the plurality of attribution masks to copies of the input image to obtain a plurality of perturbed input images;
  obtain a plurality of visualization maps based on confidence scores by inputting the plurality of perturbed copies of the input image to the CNN; and
  output, via the display, an explanation map of the output determination of the CNN based on the plurality of visualization maps,
  wherein outputting the explanation map comprises performing a fusion process to combine feature information from the plurality of visualization maps, and
  wherein the fusion process to combine feature information of visualization maps of the plurality of visualization maps comprises:
    normalizing a first visualization map of the plurality of visualization maps;
    performing unweighted addition of the normalized first visualization map and a normalized second visualization map to obtain a first result
    performing Otsu-based binarization on the normalized second visualization map to eliminate features which are not present in the normalized first visualization map to obtain a second result
    performing point-wise multiplication on the first result and the second result to obtain a third result and
    performing the fusion process using the third result and a next visualization map of the plurality of visualization maps.

* * * * *